Figure 1:
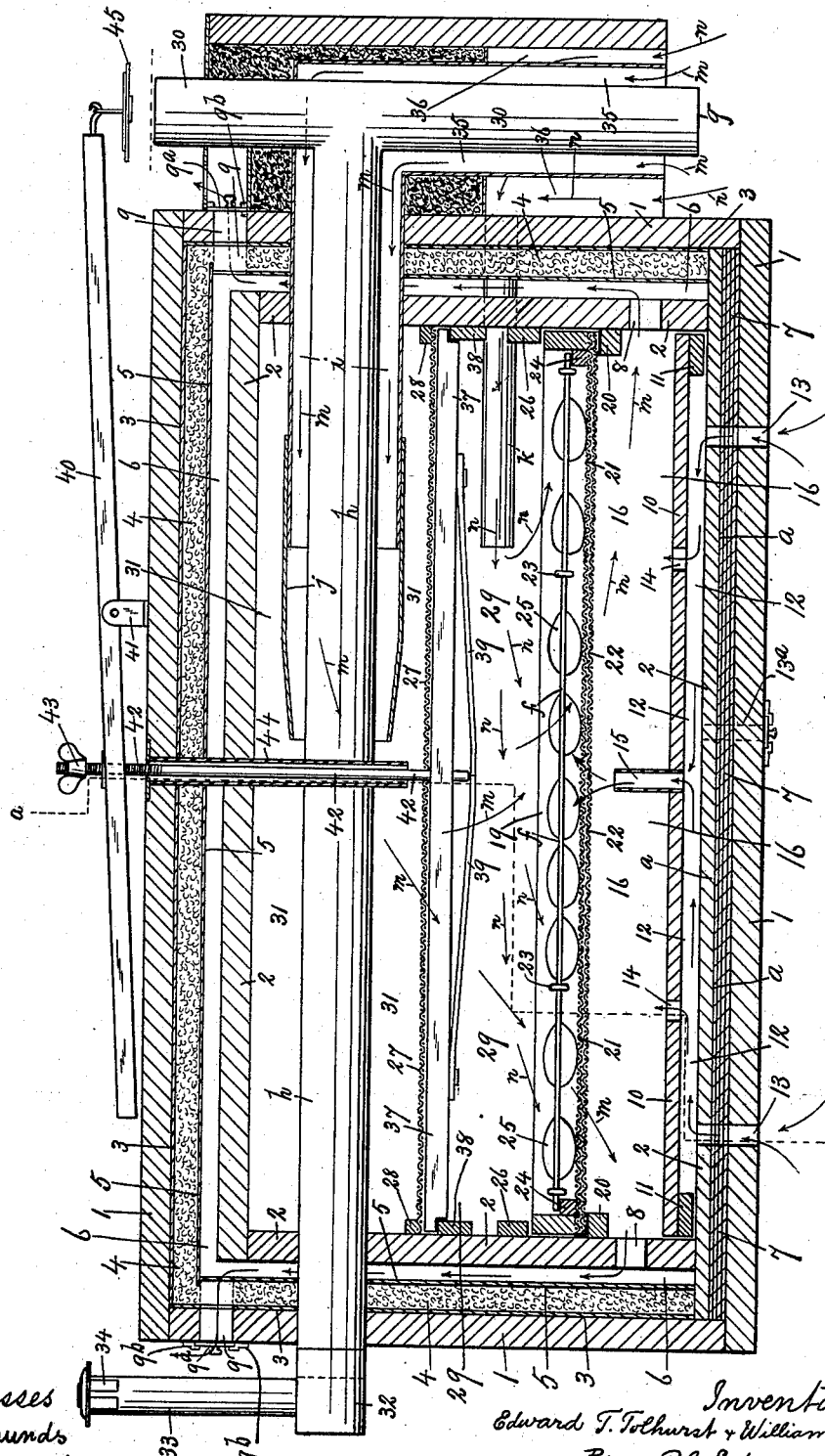

No. 756,990. PATENTED APR. 12, 1904.
E. T. TOLHURST & W. WILSON.
INCUBATOR AND BROODER.
APPLICATION FILED AUG. 3, 1903.
NO MODEL. 2 SHEETS—SHEET 1.

Witnesses
J. Edmunds
A. Beyrick

Inventors
Edward T. Tolhurst & William Wilson
By P. J. Edmunds
Attorney

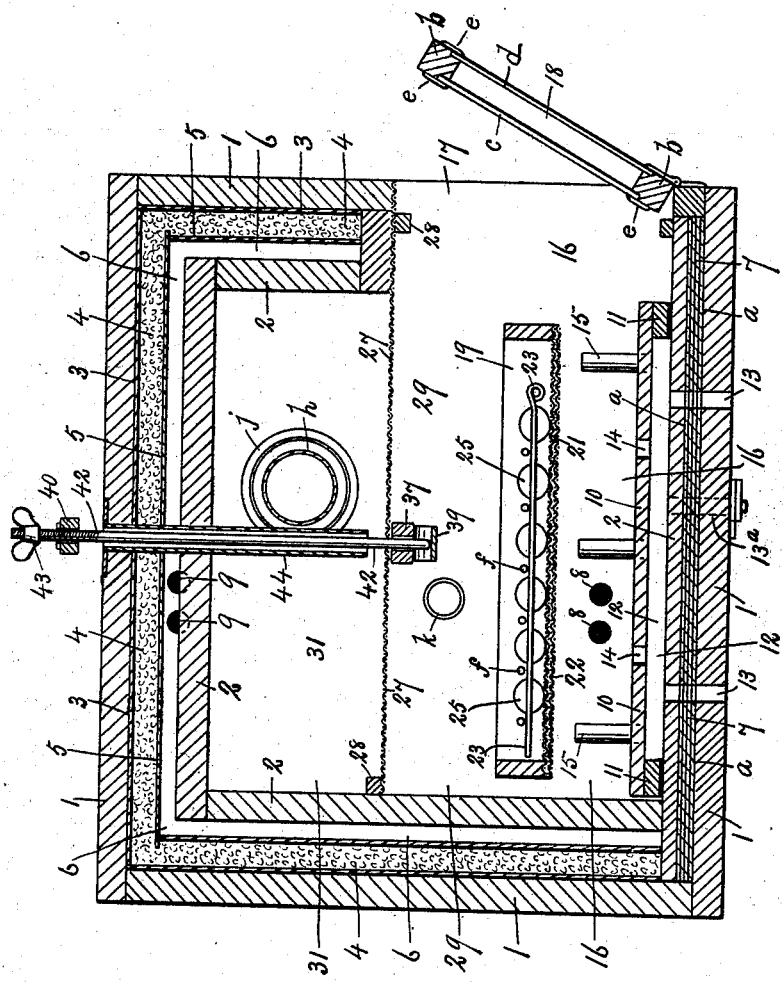

No. 756,990.

Patented April 12, 1904.

UNITED STATES PATENT OFFICE.

EDWARD T. TOLHURST, OF LONDON, AND WILLIAM WILSON, OF LONDON TOWNSHIP, CANADA.

INCUBATOR AND BROODER.

SPECIFICATION forming part of Letters Patent No. 756,990, dated April 12, 1904.

Application filed August 3, 1903. Serial No. 168,066. (No model.)

*To all whom it may concern:*

Be it known that we, EDWARD T. TOLHURST, a resident of the city of London, and WILLIAM WILSON, a resident of London township, in the county of Middlesex, in the Province of Ontario, Canada, both subjects of the King of Great Britain, have jointly invented certain new and useful Improvements in Incubators and Brooders, of which the following is a specification.

This invention relates to improvements in an apparatus kept at a uniform warmth, as by a lamp, for artificial hatching of eggs and for providing a covered and warm receptacle with a run for protecting young chicks reared without a hen; and it consists of the improved construction and novel combination of parts of the same as will be hereinafter first fully set forth and described and then pointed out in the claims, reference being had to the accompanying drawings, wherein—

Figure 1 is a central longitudinal sectional view of a combined incubator and brooder embodying our improvements. Fig. 2 is a central cross-sectional view on the line $a\,a$ of Fig. 1.

In the accompanying drawings, the numeral 1 designates the outer, and the numeral 2 the inner, spaced-apart inclosing walls, formed of wood or other suitable non-conducting material; 3, a layer of strawboard or other suitable material with which the inside of the outer closing wall 1 is lined; 4, a layer of silk floss or other suitable material adjacent to the strawboard lining 3; 5, a strawboard partition adjacent to and located at the inside of said layer of silk floss, and 6 an air-chamber between said strawboard partition 5 and the inner inclosing wall 2, and the sides, ends, and top of the incubating and brooding box or receptacle are constructed as just described; but the space between the two inclosing walls 1 and 2 at the bottom $a$ is filled with layers 7 of strawboard or other suitable non-conducting material.

8 designates outlet-openings located near the bottom of and extending through the inner inclosing wall 2 to provide air-passages from the incubating and brooding chambers to the air-chamber 6, and 9 outlet-openings located at the upper end of the air-chamber 6 and extending through the strawboard partition 5, layer of silk floss 4, strawboard lining 3, and outer inclosing wall 1 to provide air-outlet passages from the air-chamber 6 to the outside of the incubating and brooding box or receptacle, and said openings 9 are provided with draft-regulating dampers $9^a$, which are held in place by guiding-strips $9^b$ and are adjustable back and forth on the outside of said box or receptacle to close said openings 9 more or less, and thereby increase or reduce the activity of the air circulation according to the amount or quantity of the heat and moisture required in the incubator. The more open said openings 9 are the greater the activity of the air circulation and the greater the amount or quantity of the heat and moisture, and the more said openings are closed there will be less activity of the air circulation, and consequently less heat and moisture, and this is accomplished solely by the use of said draft-regulating dampers without manipulating the lamp in any way to accomplish said results.

10 designates a removable floor supported above the bottom $a$ by the battens 11, and 12 is a fresh-air chamber between said removable floor 10 and said bottom $a$.

13 designates fresh-air-inlet openings which extend through the inclosing walls 1 and 2 and the layers 7 of strawboard at the bottom of the incubating and brooding box or receptacle, through which openings 13 cool and fresh air from the outside of the box or receptacle passes into the fresh-air chamber 12.

14 designates openings in the removable floor 10, some of which are provided with short pipes 15 for conducting the cool fresh air from the fresh-air chamber 12 into the brooding-chamber 16, and said inlet-openings 14 in the removable floor 10 are not in line with the fresh-air-inlet openings 13 in the bottom $a$, so that said fresh air after passing vertically through the openings 13 into the fresh-air chamber 12 has to travel in a horizontal direction and again in a vertical direction through the openings 14 and pipes 15 in the removable bottom 10 before it passes into the brooding-chamber 16 or comes in contact with the eggs 25. The result of said air traveling in a course having short turns, as described, is to retard the flow of said fresh air into the brooder in such a manner that said fresh cool air passes gently and evenly into said brooding-chamber 16.

17 designates an opening in one side of the box or receptacle, and 18 a door for tightly closing said opening and preferably hinged to one of the sides, as shown in Fig. 2, and said door is preferably constructed of a frame *b*, in the opposite sides of which the two plates of glass *c* and *d* are secured by the fastening-strips *e*.

19 designates an egg-tray, the ends of which are supported on the battens 20, secured to the inner side of the end inclosing walls 2, and said egg-tray 19 is constructed narrower in width than the incubating or brooding chamber, as shown in Fig. 2, so that the chicks after being hatched may pass over the side of the egg-tray 19 on to the removable floor 10 of the brooding-chamber, and the bottom of said egg-tray 19 is formed of a layer of coarse canvas 21 on a layer of wire-gauze 22, both of which are secured to the bottom rim of the frame of said egg-tray 19.

23 designates an open frame provided with a series of longitudinal wires *f*, and said open frame rests on battens 24, secured to the interior face of the ends of the egg-tray 19, and the wires *f* are arranged a sufficient distance apart to permit the eggs 25 to rest between them on the bottom of the egg-tray, and said wire frame 23 is constructed of less width than the egg-tray 19 in which it is placed, which permits it to be adjusted backward and forward in said egg-tray, and the eggs resting on the bottom of the egg-tray 19, between the wires *f*, are by the adjustment of the open frame 23 rolled and gently turned all together, so that their opposite sides will rest on the bottom of the egg-tray 19.

26 designates battens secured to the interior face of the end inclosing walls 2 just above the egg-tray 19, so that when the latter is partly drawn out of the receptacle or box its inner end will abut against said battens, which will prevent it from upsetting if the grasp of the operator should be removed from it.

27 designates a coarse-canvas partition which is secured to the battens 28, and the latter are secured to the interior face of the inner inclosing walls 2. 29 designates an incubating-chamber which extends from said canvas partition 27 to and includes the egg-tray 19.

30 designates a flue-pipe, the end *g* of which is connected with the lamp or other heating apparatus used, and this flue-pipe 30 extends upward to a point about the top of the box or receptacle and has a branch *h*, which extends in at one side, then through the distributing-chamber 31, and out at the other side of said box or receptacle, and the outer end of said flue-pipe is closed by a cap 32, which is provided with an upwardly-extending branch pipe 33, in which the openings 34 are formed, and the latter are located in said outlet-pipe at a point above said box or receptacle.

35 designates a hot-air tube which surrounds the flue-pipe 30 and extends lengthwise thereof to the height shown in Fig. 1, and said tube 35 is open at the lower end and closed at the upper end and has a branch *i*, which extends through the inclosing walls 1 and 2 at one end of the box or receptacle and into the distributing-chamber 31, and *j* designates a telescoping section of said tube 35, which may be adjusted lengthwise on said branch *i*, for the purpose which will be hereinafter set forth.

36 designates a tube which surrounds the hot-air tube 35 and extends lengthwise thereof to the height shown in Fig. 1, and said tube 36 is open at the lower end and closed at the upper end and has a branch *k*, which extends through the inclosing walls 1 and 2 at one end of the box or receptacle and into the incubating-chamber 29.

37 designates a bar supported on the blocks 38, secured to the opposite ends of the inner inclosing wall 2.

39 designates a thermostat secured at its ends to the bar 37, and said thermostat when in its normal position curves slightly downward centrally from said bar 37, as shown in Fig. 1.

40 designates a lever pivoted on the fulcrum 41, secured to the top of the box or receptacle. 42 designates a rod which extends down through holes in said lever 40, the top of the box or receptacle, and bar 37, and its lower end rests on the thermostat 39, all as shown in Fig. 1, and the upper end of said rod 42 is screw-threaded, and 43 is a thumb-nut adapted to engage with and to be adjusted lengthwise on said rod. 44 designates a sleeve which is secured at its upper end to the top of the incubating box or receptacle, and said sleeve is open at both ends and extends through the top of the box or receptacle and into the distributing-chamber 31 and surrounds the rod 42 to protect the latter and at the same time prevent the escape of heat from the incubating box or receptacle. 45 designates a damper pivotally secured to the outer end of the lever 40 and arranged to rest on the upper open end of the flue-pipe 30 when required, and by means of legs (not shown) said incubating and brooding box or receptacle is supported at any suitable height above the floor or ground.

The operation is as follows: By means of the door 18 the eggs 25 are readily placed in or removed from the egg-tray 19 and being formed partly of glass or other transparent substance the condition of the eggs or young chicks in the incubating and brooding chambers is readily noted. An ordinary coal-oil lamp is preferably used to supply heat to the apparatus, the heat from which lamp passes into the flue-pipe 30 and from the latter into the branch $h$, and the heat passing into said flue-pipe 30 and branch $h$ thereof radiates therefrom into the tube 35 and branch $i$ thereof and into a portion of the chamber 31. This heats the air in said tube 35, in the branch $i$ thereof, and in said chamber 31, which heated air passes through the coarse-canvas partition 27 and flows down in a steady stream of pure hot air or heat through the incubating and brooding chambers and toward both ends, as indicated by the arrows $m$, and out through the outlet-openings 8 into the air space or chamber 6, which air passing into said air-chamber 6 warms the air therein, and thus assists in maintaining a stationary temperature in the incubating and brooding chambers, and said air having to pass down through the coarse-canvas partition 27 is filtered, retarded, and distributed throughout the chamber 31 and flows in a steady stream of pure hot air or heat gently and evenly down into and through said incubating and brooding chambers, and while passing through the two latter chambers the heat is practically all expended therein, and the air passing on out through the lower openings 8 and upper outlet-openings 9 carries any foul air or odor given off by the eggs during the process of incubation or from the young chicks to the outside of and above the box or receptacle. The branch $i$ of the hot-air tube 35 has a telescoping section $j$, which adapts said branch $i$ to be lengthened or shortened for the purpose of delivering a greater volume of heated air at one end of the incubating-chamber than the other when desired, so that if one of the outer ends of the box or receptacle was so placed that it would be affected by a lower temperature than the other this telescoping section $j$ adapts said tube to direct a larger portion of the volume of heated air to this end affected by the lower temperature, and thus assist in maintaining a uniformity of temperature throughout the incubating-chamber, and the fresh cool air passing through the openings 13, fresh-air chamber 12, and openings 14 a steady stream of cool pure air is kept flowing on the eggs as well as on the chicks when in the brooder, and said cool air having to pass through the coarse canvas 21 and wire screen 22, forming the bottom of the egg-tray 19, prevents said cool air from acting on or affecting the eggs 25 too energetically, and the action of this steady stream of fresh cool air flowing gently and evenly onto the eggs is to strengthen and invigorate the chicks during incubation and also to strengthen them after they pass out of their shells into the brooder. By means of the tube 36 and branch $k$ a steady stream of fresh cool air moderately heated by the radiation of the heat from the tube 35 is conducted into the incubating-chamber 29 over the eggs 25 therein, and this steady stream of fresh cool air coming in contact with and intermingling with the heated air from the branch $i$ of the tube 35 and chamber 31 moisture is formed, which is carried down with the heat through the eggs in the direction indicated by the arrows $n$ to supply the eggs with the moisture necessary for their perfect and complete incubation, and by means of the draft-regulating dampers $9^a$ the activity of the air circulation through the incubating and brooding chambers is increased or reduced, and as a result the quantity of heat and moisture passing down through the eggs is increased or reduced at will in said incubating-chamber, and the quantity of heat and moisture supplied to the eggs is regulated by said regulating-dampers without manipulating the lamp in any way to accomplish this result, all as hereinbefore described, and if by carelessness or neglect any odor, smoke, or other heavy products of combustion should be given off by the lamp used to supply heat to this apparatus said products will pass into and through the flue-pipe 30 and branch $h$ and out of the openings 34 at a point above the box or receptacle, and if any of the smoke or heavy products of combustion were of such a nature that they would adhere to the interior face or accumulate in the pipe 30 or branch $h$ by removing the damper 45 and cap 32 any such may be removed by a dry swab or dry cloth on the end of a stick and easily and instantly accomplished by inserting the dry swab in at the cap end of the branch $h$ and moving it backward and forward, once in each direction, through the branch $h$ and the pipe 30, and this can be done so easily and quickly and the cap 32 and lamp removed and replaced so rapidly that the interruption of the supply of heat will not practically affect the temperatures in the incubating and brooding chambers 16 and 29, respectively. As the heated air passes into the incubating-chamber 29 it comes in contact with the thermostat 39 and causes the latter to lower. This permits the rod 42 and the adjacent end of the lever 40, held in engagement therewith by the thumbscrew 43, to lower and the opposite end of the lever and damper 45 to raise from the upper end of the flue-pipe 30, and when the temperature in the incubating-chamber 29 above the egg-tray 19 is 103° Fahrenheit the thumbscrew 43 is turned to permit the damper 45 to float one-eighth of an inch above the upper end of the flue-pipe 30, and when said temperature is 103° Fahrenheit in the incubating-chamber 29, adjacent to the egg-tray 19, the effect of the heated air coming in contact with the fresh cool air in the brooder is to give a temperature adjacent to the removable floor 10 of 90° Fahrenheit, and if the heat supplied by the heating apparatus should vary the thermostat 39, damper 45, and connections, together with the draft-regulating dampers $9^a$, would regulate the supply of heat and moisture to the incubating and brooding chambers to maintain an even uniform temperature of 103° Fahrenheit in the incubating and 90° Fahrenheit in the brooding chamber. At first when the chicks are hatched and pass over the side of the egg-tray onto the removable floor 10 of the brooding-chamber 16 the temperature in the latter is 90° Fahrenheit, and as the chicks become older and stronger the temperature in said brooder may be gradually lowered to 60° Fahrenheit, if necessary, by providing additional openings 13ª, similar to openings 13, in the bottom *a* and providing them with covers similar to the draft-regulating dampers 9ª, so that by removing said covers, more or less, from said additional openings in the bottom *a* the temperature in the brooding-chamber may be lowered by reason of the larger volume of fresh cool air passing into the brooding-chamber, and this may be done without interfering with the temperature of 103° Fahrenheit in the incubating-chamber, and by using a removable bottom or floor 10 in the brooding-chamber it may be taken out and cleansed without interfering with or disturbing the other parts of the apparatus. As a result a simple, strong, durable, inexpensive, and efficient apparatus for the purpose described has been provided—one in which foul or stagnant air cannot remain, one in which none of the smoke or odor given off by the lamp, if the latter should be neglected, can enter either the incubating or brooding chamber, one in which the flue-pipe can be so rapidly cleaned that it may be done during the process of incubation without affecting the temperature or injuriously disturbing the incubating process, and one in which the temperature in either the incubating or brooding chamber may be raised or lowered or held steady without interfering with or disturbing the temperature in the other chamber.

Having thus described our invention, we claim—

1. In a device of the class described, a box or receptacle consisting of inner and outer spaced-apart inclosing walls, in combination with layers of strawboard placed between said spaced-apart inclosing walls, substantially as and for the purpose set forth.

2. In a device of the class described, a box or receptacle consisting of inner and outer spaced-apart inclosing walls, in combination with a lining of strawboard adjacent to the inner side of the outer inclosing wall, a layer of silk floss or similar material adjacent to said strawboard lining, a strawboard partition at the inner side of said silk floss, and an air space or chamber between said strawboard partition and said inner inclosing wall, substantially as and for the purpose set forth.

3. In a device of the class described, a box or receptacle, in combination with a flue-pipe, a branch from which extends through said box or receptacle, a cap on the end of said branch, a branch extending upward from said cap, and an opening or openings formed in the upper end of said branch, substantially as and for the purpose set forth.

4. In a device of the class described, a box or receptacle, a flue-pipe, a branch pipe extending from said flue-pipe through said box or receptacle, a cap on the end of said branch, a branch extending upward from said cap, and an opening or openings formed in the upper end of said branch, in combination with a hot-air tube open at its lower end and closed at its upper end and surrounding said flue-pipe, and a branch tube extending from said hot-air tube, surrounding said branch flue-pipe, and extending into said box or receptacle, substantially as and for the purpose set forth.

5. In a device of the class described, a box or receptacle, a flue-pipe, and a branch pipe extending from said flue-pipe through said box or receptacle, in combination with a hot-air tube, open at its lower end and closed at its upper end and surrounding said flue-pipe, a branch tube extending from said hot-air tube, surrounding said branch flue-pipe, and extending into said box or receptacle, and a telescoping tubular section adapted to be adjusted back and forth on the branch from said hot-air tube, substantially as and for the purpose set forth.

6. In a device of the class described, a box or receptacle, and a canvas partition therein, in combination with a flue-pipe, a branch pipe extending from said flue-pipe through said box or receptacle, a cap on the end of said branch, a branch extending upward from said cap, and an opening or openings formed in the upper end of said branch, a hot-air tube open at its lower end and closed at its upper end and surrounding said flue-pipe, and a branch tube surrounding said branch flue-pipe and extending from said hot-air tube into said box or receptacle, substantially as and for the purpose set forth.

7. In a device of the class described, a box or receptacle, and an egg tray or holder therein, in combination with a flue-pipe, a branch pipe extending from said flue-pipe through said box or receptacle, a hot-air tube open at its lower end and closed at its upper end and surrounding said flue-pipe, a branch tube surrounding said branch flue-pipe and extending from said hot-air tube into said box or receptacle, a tube surrounding said hot-air tube and open at its lower end and closed at its upper end, and a branch tube extending from said tube into said box or receptacle, below said hot-air tube, and above said egg tray or holder, substantially as and for the purpose set forth.

8. In a device of the class described, a box or receptacle, a canvas partition therein, and an egg-tray below said canvas partition, in combination with a flue-pipe, a branch pipe extending from said flue-pipe through said box or receptacle above said canvas partition, a hot-air tube open at its lower end and closed at its upper end and surrounding said flue-pipe, a branch tube surrounding said branch flue-pipe and extending from said hot-air tube into said box or receptacle, a tube surrounding said hot-air tube and open at its lower end and closed at its upper end, and a branch tube extending from said tube into said box or receptacle, below said canvas partition, and above said egg-tray, substantially as and for the purpose set forth.

9. In a device of the class described, a box or receptacle consisting of two spaced-apart inclosing walls, an air space or chamber between said inclosing walls, outlet-openings formed in the ends of said inner inclosing walls near the bottom and in the ends of the outer inclosing walls near their top, in combination with a flue-pipe, a branch pipe extending from said flue-pipe through said box or receptacle, a cap on the end of said branch, a branch extending upward from said cap, and an opening or openings formed in the upper end of said branch, a hot-air tube open at its lower end and closed at its upper end and surrounding said flue-pipe, and a branch tube surrounding said branch flue-pipe and extending from said hot-air tube into said box or receptacle, substantially as and for the purpose set forth.

10. In a device of the class described, a box or receptacle consisting of two spaced-apart inclosing walls, an air space or chamber between said inclosing walls outlet-openings formed in the ends of said inner inclosing walls near the bottom and in the ends of the outer inclosing walls near their top, a canvas partition, and an egg tray or holder below said canvas partition, both located in said box or receptacle, in combination with a flue-pipe, a branch pipe extending from said flue-pipe through said box or receptacle above said canvas partition, a hot-air tube open at its lower end and closed at its upper end and surrounding said flue-pipe, a branch tube surrounding said branch flue-pipe, and extending from said hot-air tube into said box or receptacle, a tube surrounding said hot-air tube and open at its lower end and closed at its upper end, and a branch tube extending from said tube into said box or receptacle, below said canvas partition, and above said egg-tray, substantially as and for the purpose set forth.

11. In a device of the class described, a box or receptacle consisting of two spaced-apart inclosing walls, an air space or chamber between said inclosing walls, openings formed in the ends of said inner inclosing walls near the bottom and in the outer inclosing walls near the top, openings formed in the bottom of said box or receptacle, a removable floor in which openings are formed, and an air space or chamber between said removable floor and the inner face of the bottom of said box or receptable, in combination with a flue-pipe, a branch pipe extending from said flue-pipe through said box or receptacle, a hot-air tube open at its lower end and closed at its upper end and surrounding said flue-pipe, and a branch tube surrounding said branch flue-pipe and extending from said hot-air tube into said box or receptacle, substantially as and for the purpose set forth.

12. In a device of the class described, a box or receptacle consisting of two spaced-apart inclosing walls, an air space or chamber between said inclosing walls, openings formed in the ends of said inner inclosing walls near the bottom and in the outer inclosing walls near the top, openings formed in the bottom of said box or receptacle, a removable floor in which openings are formed, an air space or chamber between said removable floor and the inner face of the bottom of said box or receptacle, a canvas partition in said box or receptacle, and an egg tray or holder below said canvas partition, both located in said box or receptacle, in combination with a flue-pipe, a branch pipe extending from said flue-pipe through said box or receptacle above said canvas partition, a hot-air tube open at its lower end and closed at its upper end and surrounding said flue-pipe, a branch tube surrounding said branch flue-pipe, and extending from said hot-air tube into said box or receptacle, a tube surrounding said hot-air tube and open at its lower end and closed at its upper end, and a branch tube extending from said tube into said box or receptacle, below said canvas partition, and above said egg-tray, substantially as and for the purpose set forth.

13. In a device of the class described, a box or receptacle consisting of two spaced-apart inclosing walls, an air space or chamber between said inclosing walls, outlet-openings formed in the ends of said inner inclosing walls near the bottom and in the ends of the outer inclosing walls near their top, and draft-regulating dampers adapted to close more or less of the openings at the top of the outer inclosing walls, in combination with a flue-pipe, a branch pipe extending from said flue-pipe through said box or receptacle, a cap on the end of said branch, a branch extending upward from said cap, and an opening or openings formed in the upper end of said branch, a hot-air tube open at its lower end and closed at its upper end and surrounding said flue-pipe, and a branch tube surrounding said branch flue-pipe and extending from said hot-air tube into said box or receptacle, substantially as and for the purpose set forth.

14. In a device of the class described, a box or receptacle consisting of two spaced-apart inclosing walls, an air space or chamber between said inclosing walls, outlet-openings formed in the ends of said inner inclosing walls near the bottom and in the ends of the outer inclosing walls near their top, draft-regulating dampers adapted to close more or less of the openings at the top of the outer inclosing wall, a canvas partition, and an egg tray or holder below said canvas partition, both located in said box or receptacle, in combination with a flue-pipe, a branch pipe extending from said flue-pipe through said box or receptacle above said canvas partition, a hot-air tube open at its lower end and closed at its upper end and surrounding said flue-pipe, a branch tube surrounding said branch flue-pipe, and extending from said hot-air tube into said box or receptacle, a tube surrounding said hot-air tube and open at its lower end and closed at its upper end, and a branch tube extending from said tube into said box or receptacle, below said canvas partition, and above said egg-tray, substantially as and for the purpose set forth.

15. In a device of the class described, a box or receptacle consisting of two spaced-apart inclosing walls, an air space or chamber between said inclosing walls, openings formed in the ends of said inner inclosing walls near the bottom and in the outer inclosing walls near the top, draft-regulating dampers adapted to close more or less of the openings at the top of the outer inclosing wall, openings formed in the bottom of said box or receptacle, a removable floor in which openings are formed, and an air space or chamber between said removable floor and the inner face of the bottom of said box or receptacle, in combination with a flue-pipe, a branch pipe extending from said flue-pipe through said box or receptacle, a hot-air tube open at its lower end and closed at its upper end and surrounding said flue-pipe, and a branch tube surrounding said branch flue-pipe and extending from said hot-air tube into said box or receptacle, substantially as and for the purpose set forth.

16. In a device of the class described, a box or receptacle consisting of two spaced-apart inclosing walls, an air space or chamber between said inclosing walls, openings formed in the ends of said inner inclosing walls near the bottom and in the outer inclosing walls near the top, draft-regulating dampers adapted to close more or less of the openings at the top of the outer inclosing wall, openings formed in the bottom of said box or receptacle, a removable floor in which openings are formed, an air space or chamber between said removable floor and the inner face of the bottom of said box or receptacle, a canvas partition in said box or receptacle, and an egg tray or holder below said canvas partition, both located in said box or receptacle, in combination with a flue-pipe, a branch pipe extending from said flue-pipe through said box or receptacle above said canvas partition, a hot-air tube open at its lower end and closed at its upper end and surrounding said flue-pipe, a branch tube surrounding said branch flue-pipe and extending from said hot-air tube into said box or receptacle, a tube surrounding said hot-air tube and open at its lower end and closed at its upper end, and a branch tube extending from said tube into said box or receptacle, below said canvas partition, and above said egg-tray, substantially as and for the purpose set forth.

17. In a device of the class described, a box or receptacle, a flue-pipe, a branch pipe extending from said flue-pipe through said box or receptacle, a cap on the end of said branch, a branch extending upward from said cap, and an opening or openings formed in the upper end of said branch, a hot-air tube open at its lower end and closed at its upper end and surrounding said flue-pipe, and a branch tube extending from said hot-air tube, surrounding said branch flue-pipe, and extending into said box or receptacle, in combination with a bar, a thermostat secured to the under side of said bar, a rod resting on said thermostat and extending upward through said bar and the top of said box or receptacle, and its upper end screw-threaded, a winged nut adapted to engage with the upper screw-threaded end of said rod, a lever pivoted on a fulcrum secured to said box or receptacle, and its inner end adapted to engage with the upper end of said rod, and a damper suspended from the outer end of said lever over the upper end of said flue-pipe, substantially as and for the purpose set forth.

18. In a device of the class described, a box or receptacle, a canvas partition, and an egg tray or holder located therein, a flue-pipe, and a branch pipe extending from said flue-pipe through said box or receptacle, a hot-air tube open at its lower end and closed at its upper end and surrounding said flue-pipe, a branch tube extending from said hot-air tube, surrounding said branch flue-pipe, and extending into said box or receptacle, a tube surrounding said hot-air tube and open at its lower end and closed at its upper end, and a branch tube extending from said tube into said box or receptacle, below said canvas partition, and above said egg-tray, in combination with a bar, a thermostat secured to the under side of said bar, a rod resting on said thermostat and extending upward through said bar and the top of said box or receptacle, and its upper end screw-threaded, a winged nut adapted to engage with the upper screw-threaded end of said rod, a lever pivoted on a fulcrum secured to said box or receptacle and its inner end adapted to engage with the upper end of said rod, and a damper suspended from the outer end of said lever over the upper end of said flue-pipe, substantially as and for the purpose set forth.

In testimony whereof we have signed in the presence of the two undersigned witnesses.

EDWARD T. TOLHURST.
WILLIAM WILSON.

Witnesses:
P. J. EDMUNDS,
A. BYRICK.